Aug. 7, 1951     H. T. WOOLSON ET AL     2,563,090
SUSPENSION
Filed Dec. 29, 1944     2 Sheets-Sheet 1
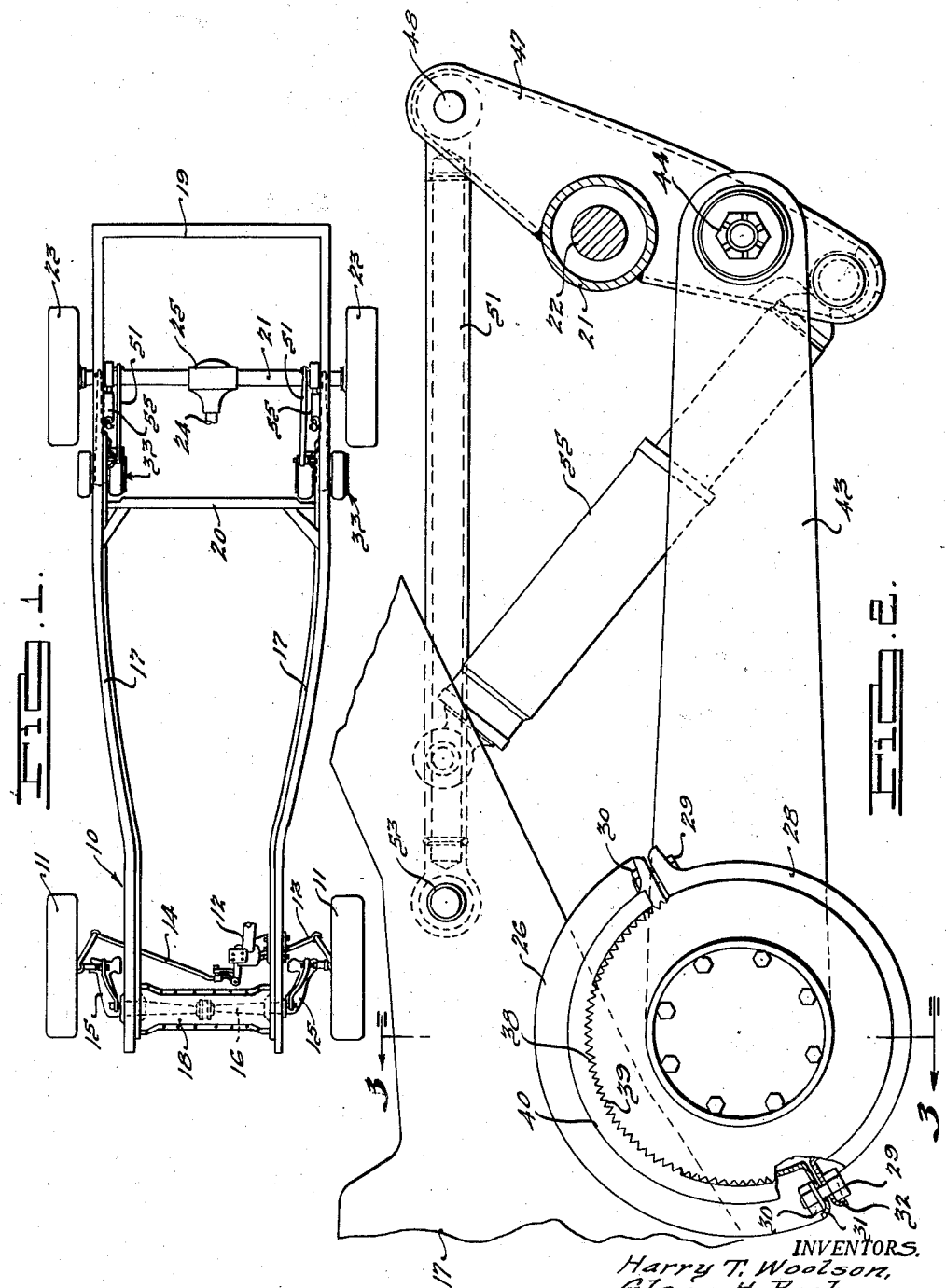
INVENTORS.
Harry T. Woolson,
Glenn H. Parker.
BY
Harness and Harris
ATTORNEYS.

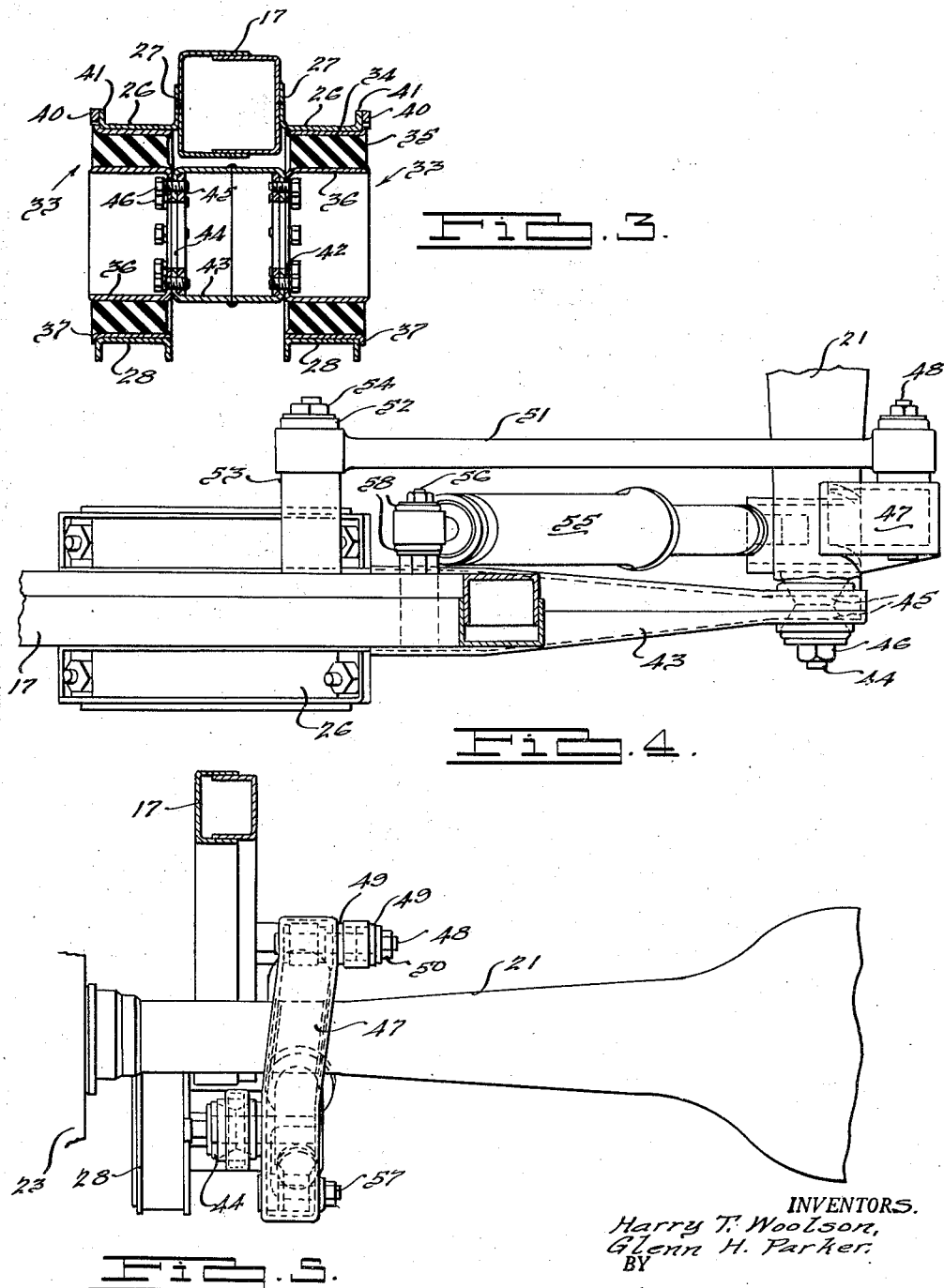

Patented Aug. 7, 1951

2,563,090

UNITED STATES PATENT OFFICE 2,563,090

SUSPENSION

Harry T. Woolson, Detroit, and Glenn H. Parker, Birmingham, Mich., assignors to Chrysler Corporation, Highland Park, Mich., a corporation of Delaware Application December 29, 1944, Serial No. 570,254

12 Claims. (Cl. 267—21)

This application relates to a vehicle suspension. More specifically it relates to a construction involving the connection of a frame for an automotive vehicle to an axle housing.

It is known to provide a construction for suspending a vehicle frame on a rear axle housing, involving arms connected at one end to the frame in rubber joints permitting resisted angular movement of the arms and at the other ends to the axle housing below its centerline with resultant reduction in stresses applied to the axle housing. We have devised improvements in constructions of this sort and more particularly in the rubber joints mounting the arms on the frame and in the use of means supplemental to the arms for connecting the vehicle frame and the rear axle housing.

An object of the present invention is to provide improvements in a vehicle suspension and more particularly in the resilient mounting of one end of a vehicle frame on an axle housing carrying a driving axle. This mounting may involve the use of arms connected to the axle housing below its centerline and to the frame in resilient torsion-resisting joints.

A further object is the provision of improved resilient mountings or joints that are formed of an elastic ring such as rubber that will elastically resist angular movement between parts connected by the joints. Such joints or mountings may be employed in a vehicle suspension for connecting arms to a vehicle frame, which arms are also connected to an axle housing.

Another object is to provide an adjustment of the mounting of an elastic ring formed, for example, of rubber, which ring is intended to constitute a resilient joint permitting angular movement between certain parts. Two such rings, axially spaced from one another may constitute the joint. The joint may be employed to connect a vehicle frame with arms connected in turn with an axle housing. Thus there is provided an adjustment of the angular position of the arms with respect to the frame.

Still another object is the provision of improvements in vehicle suspension of the type involving parallel links. Parallel links may be used in the mounting of a vehicle frame on an axle housing containing a driving axle.

Other objects will appear from the disclosure.

In the drawing:

Fig. 1 is a plan view of a vehicle frame incorporating the novel features of the present invention;

Fig. 2 is a side view partially in section of a portion of the novel vehicle suspension of the present invention;

Fig. 3 is a sectional view taken on the line 3—3 of Fig. 2;

Fig. 4 is a plan view of the structure shown in Fig. 2; and

Fig. 5 is a rear view of the structure shown in Fig. 2.

Reference character 10 designates a vehicle frame that is supported at its front end upon steerable wheels 11 controlled through a steering post 12 and linkages 13 and 14. The wheels 11 are mounted upon rearwardly extending arms 15 and attached to the ends of a front axle 16. The frame 10 comprises longitudinal side members 17, a transverse connecting structure 18 at the front end of the members 17, a transverse connecting member 19 at the rear end of the members 17, and an intermediate transverse tie member 20. Just rearward of the transverse member 20 the side members 17 slope upwardly as shown in Fig. 2 so as to be able to clear a rear axle housing 21 containing a live driving axle 22, which drives rear wheels 23. The rear axle 22 is adapted to be driven by a shaft not shown contained in a tube 24 connected to a differential housing portion 25 at the mid section of the rear axle housing 21, which differential housing portion 25 contains differential mechanism transmitting drive from the shaft in the tube 24 to the axle 22.

As seen in Figs. 2 and 3, semi-circular channels 26 each have one long side 27 which is secured by soldering or welding to the portion of each frame side member 17 just rearward of the transverse tie member 20. Semi-circular channels 28 are secured to the channels 26 by means of bolts 29 and nuts 30, the bolts passing through flanges 31 and 32 on the channels 26 and 28 respectively. The channels 28 hold against the channels 26 a pair of resilient joint structures 33 each composed of an outer ring 34 in contact with the channels 26 and 28, an annulus 35 of a suitable resilient material such as rubber, and an inner ring 36. The inner and outer rings 34 and 36 are bonded respectively to the inner and outer peripheries of the annuli 35, which are spaced from one another and in axial alignment. Each outer ring 34 has at one end an outwardly directed flange 37 along one-half of the circumference of which is provided a large number of small teeth 38. These teeth 38 fit between teeth 39 which are also small and in large number and are formed for about 90° in a semi-circular part 40 secured as by soldering or welding to a short side 41 of each channel 26. Each inner ring 36 has an inwardly directed flange 42 at one end which is secured to an arm 43 about an opening 44 formed in each side thereof. The securement is accomplished by means of a ring 45 placed within the opening 44 and a plurality of screws 46 extending through the flange 42 and the portion of the arm 43 immediately surrounding the opening 44 and having threaded engagement with the ring 45. The arm 43 is formed in mating halves joined together as by soldering or welding.

There are two arms 43, one at each side of the vehicle frame 10 and each connected at its front end to a side frame member 17 by the resilient joint structures 33. The rear end of each arm 43 is secured to a bolt 44 by means of frusto conical rubber bushings 45 and a nut 46. The bolt extends through a hollow bracket 47 being secured thereto as by soldering or welding and the rear end of the arm is mounted on the portion of the bolt exterior of the bracket 47. There are two brackets 47, one near each end of the axle housing 21. Each bracket is hollow and is secured as by soldering or welding, to the axle housing 21 in embracing relation with respect to the rear and bottom thereof. The bolt 44 upon which the rear end of the arm 43 is mounted, is secured to a portion of the bracket 47 that depends from the axle housing 21. The bracket 47 also projects above the axle housing 21 and to this portion is secured a bolt 48 as by soldering or welding, which bolt passes through the bracket 47. A pair of cooperating rubber bushings 49 are retained upon the bolt 48 by means of a nut 50. The rear end of a link 51 is mounted upon the bushings 49 and the front end thereof is pivotally mounted by means of a rubber bushing 52 upon a bolt 53. The bolt 53 extends through a side frame member 17 and is secured thereto as by soldering or welding. Nut 54 retains the bushing 52 upon the bolt 53. The length of the link 51 between the bolts 48 and 53 is the same as the length of the arm 43 between the bolt 44 and the axis of the joint structures 33, and likewise the distance between the bolt 44 and the bolt 48 is the same as the distance between the centerline of the joint structures 33 and the bolt 53. Thus there is provided a parallelogram of linkages composed of the arm 43, link 51, the bracket 47, the joint structures 33, the channels 26 and the portions of the side frame members 17 between the bolt 53 and the channels 26. At each side of the vehicle frame 10 is provided a shock absorber 55 which may be of a well-known fluid type connected at one end to a bolt 56 secured to a side frame member 17 and at the other end to the lower end of the bracket 47 by means of a bolt 57. Rubber bushings 58 are provided at the one end for the connection of the shock absorber to the bolt 56 and similar appropriate bushings not shown, are provided at the other end for connection of the bolt 57. As seen in Fig. 4, shock absorber 55 projects within the bracket 47, the arm 43 is connected by the bolt 44 to the outer side of the bracket 47, and the link 51 is connected by the bolt 48 to the inner side of the bracket 47.

In operation, the weight of the vehicle is of course, carried upon the vehicle frame 10, the rear end of which transmits its load to the arms 43 which in turn transmit the load to the brackets 47 and the rear axle housing 21. Since the connection of the arms 43 to the rear axle housing 21 is in portions of the brackets 47 that are below the axle housing and the centerline thereof, there is a twist exerted upon the axle housing 21 acting in a counterclockwise direction as viewed in Fig. 2. This twist is in opposition to the twist effected upon the axle housing as a result of torque reaction due to the application of force by the axle 22 and rear wheels 23 acting through housing 21 and the arms 43 to propel the vehicle forwardly. This latter torque reaction acts in a clockwise direction and thus the two torque reactions subtract from one another. The torque reaction transmitted to the axle housing 21 by braking applied to the wheels 23 also acts in a clockwise direction and so is in opposition to the counterclockwise direction of twist upon the axle housing produced by the load of the vehicle upon the frame 10. Since the arms 43 are connected below the axle housing 21 and the depending brackets 34, application of force by the axle 22 and the wheels 23 to move the vehicle forwardly causes a twist to be exerted at the region where the arms 43 are connected to the depending brackets 47. Any harm resulting from strain and wear on the parts at this region is prevented by the links 51 which act as torque members in that they restrain the tendency toward counterclockwise movement of the axle housing 21.

Angular movement of the arms 43 with respect to the frame 10, which may result from change in the loading upon the frame 10 or in travelling over rough or uneven ground, is made possible by the rubber annuli 35 of the joint structures 33. These rubber annuli by twisting of their inner peripheries with respect to their outer peripheries permit the necessary angular movement of the arms 43 about the axis of the annuli 35. Suppose that one wheel 23 is higher than the other wheel 23 because of unevenness of the ground over which the vehicle travels, any tendency of the axle housing 21 to twist due to the resultant tilting of the axle housing is prevented by the parallelograms of linkages that include the links 51 and the arms 43. Thus no matter how the vertical position of one end of the axle housing changes with respect to the other end, there is no angular movement of the axle housing about its own axis as a result of the change in vertical position, and consequently there is no twist to the axle housing.

The teeth 39 on the arcuate parts 40 secured to the channels 26, engage the teeth 38 on the flanges 37 on the outer rings 34 of the joint structures 33 and thus angular movement of the ring 34 with respect to the channels 26 and 28 is prevented. Thus the angular position of the arms 43 with respect to the side frame members 17 for any given condition of loading is determined. If it is desired to change this angle so that, for example, the frame 10 may be higher or lower with respect to the axle 21, the bolts 29 are loosened sufficiently so that the joint structures 33 may be moved downwardly enough to take the teeth 38 out of engagement with the teeth 39. When this is done the arms 43 are shifted to another desired angular position, the joint structures 33 are raised to bring the teeth 38 back into engagement with the teeth 39, and the bolts 29 are tightened to main this engagement. Since there is a large number of teeth 38 and 39, there is good securement of the joint structures 33 to the channels 26 such as to insure no change in angle of the joint structures. Since the teeth 38 and 39 are small, a very fine adjustment of the angle of the arms 43 with respect to the frame 10 is obtainable.

We claim:

1. The combination with a vehicle frame and a suspension arm; of means connecting the arm and the frame in a joint resiliently resisting torsion of the arm with respect to the frame, said joint being formed of a pair of elastic annuli spaced from one another in axial alignment and receiving the arm between them, means bonded to the outer surfaces of the annuli and secured to the frame, and rings bonded to the inner surfaces of the annuli and having inwardly extending flanges secured to the arm.

2. The combination with a vehicle frame and a suspension arm; of means connecting the arm and the frame in a joint resiliently resisting torsion of the arm with respect to the frame, said joint being formed of a pair of elastic annuli spaced from one another in axial alignment and receiving the arm between them, means bonded to the outer surfaces of the annuli and secured to the frame, and rings bonded to the inner surfaces of the annuli and having at their inner ends inwardly extending flanges secured to the arm.

3. The combination with a vehicle frame and a suspension arm; of means connecting the arm to the frame in a joint resiliently resisting torsion of the arm with respect to the frame, said joint comprising a pair of axially aligned elastic annuli spaced from one another, means securing the inner peripheries of the annuli to the arm, rings bonded to the outer peripheries of the annuli, fixed members secured to the frame and partially embracing the rings, and releasable members detachably securable to the fixed members for partially embracing the rings so as to hold them against the fixed members, and pluralities of mating teeth provided respectively on relative under portions of the fixed members and on relatively upper portions of the rings for preventing movement of the rings with respect to the fixed members about the axis of the annuli during securement of the releasable members to the fixed members and being disengageable from one another incident to loosening of the releasable members from the fixed members and separation of the relatively upper portions of the rings downwardly from the under portions of the fixed members to provide for shifting of the rings about the axis of the annuli with resultant corresponding shifting of the arm.

4. The combination with a vehicle frame and a suspension arm; of means connecting the frame and the arm in a joint resiliently resisting torsion of the arm with respect to the frame, said joint comprising a pair of axially aligned elastic annuli spaced from one another, rings bonded to the outer peripheries of the annuli, means securing the inner peripheries of the annuli to the arm, fixed members secured to the frame and partially embracing the rings, releasable members detachably securable to the fixed members for partially embracing the rings so as to hold them against the fixed members, toothed elements secured to the outer ends of the fixed members exposing teeth generally accessible and engageable from below, the outer ends of the rings having teeth formed on upper portions thereof mating with the toothed elements for preventing movement of the rings with respect to the fixed members about the axis of the annuli during securement of the releasable members to the fixed members and being disengageable downwardly from the toothed elements upon loosening of the releasable members from the fixed members to provide for shifting of the rings about the axis of the annuli with resultant corresponding shifting of the arm.

5. The combination with a vehicle frame and a suspension arm; of means connecting the frame and the arm in a joint resiliently resisting torsion of the arm with respect to the frame, said joint comprising a pair of axially aligned elastic annuli spaced from one another and receiving the arm between them, first rings bonded to the outer peripheries of the annuli, second rings bonded to the inner peripheries of the annuli and having inwardly extending flanges secured to the arm, fixed members secured to the frame and partially embracing the first rings, releasable members detachably secured to the fixed members for partially embracing the first rings so as to hold them against the fixed members, toothed elements secured to the outer ends of the fixed members, the outer ends of the first rings having teeth mating with the toothed elements for preventing movement of the first rings with respect to the fixed members about the axis of the annuli during securement of the releasable members to the fixed members and being disengageable from the toothed elements upon loosening of the releasable members from the fixed members to provide for shifting of the first rings about the axis of the annuli with resultant corresponding shifting of the arm.

6. The combination with a vehicle frame and a suspension arm; of means connecting the frame and the arm in a joint resiliently resisting torsion of the arm with respect to the frame said joint comprising a pair of axially aligned elastic annuli spaced from one another and receiving the arm between them, first rings bonded to the outer peripheries of the annuli and having outwardly extending flanges at their outer ends, second rings bonded to the inner peripheries of the annuli and having at their inner ends inwardly extending flanges secured to the arm, fixed semi-circular members secured to the frame and partially embracing the first rings and having outwardly extending flanges at their outer ends, releasable semi-circular members detachably secured to the fixed members for partially embracing the first rings so as to hold them against the fixed members, toothed elements secured to the flanges on the fixed members, the flanges on the first rings being provided with teeth mating with the toothed elements for preventing movement of the first rings with respect to the fixed members about the axis of the annuli during securement of the fixed and releasable members to one another and being disengageable from the toothed elements upon loosening of the releasable members from the fixed members to provide for shifting of the first rings about the axis of the annuli with resultant corresponding shifting of the arm.

7. The combination with a vehicle frame and a suspension arm; of means connecting the frame and the arm in a joint resiliently resisting torsion of the arm with respect to the frame, said joint comprising a pair of axially aligned elastic annuli spaced from one another and receiving the arm between them, first rings bonded to the outer peripheries of the annuli and having outwardly extending flanges at one end, second rings bonded to the inner peripheries of the annuli and attached to the arm, fixed semi-circular members secured to the frame and partially embracing the first rings and having outwardly extending flanges at one end, releasable semi-circular members detachably securable to the fixed members for partially embracing the first rings so as to hold them against the fixed members, and pluralities of mating teeth associated with the outwardly extending flanges on the fixed members and the first rings preventing movement of the rings with respect to the fixed members about the axis of the annuli during securement of the releasable members to the fixed members and being disengageable from one another upon loosening of the releasable members from the fixed members to provide for shifting of the rings about the axis of the annuli with resultant corresponding shifting of the arm.

8. The combination with a vehicle frame and a suspension arm; of means connecting the arm to the frame in a joint resiliently resisting torsion of the arm with respect to the frame, said joint comprising a pair of axially aligned elastic annuli spaced from one another, means securing one periphery of each annulus to the arm, rings bonded to the other peripheries of the annuli, fixed members secured to the frame and partially embracing the rings, releasable members detachably securable to the fixed members for partially embracing the rings so as to hold them against the fixed members, and pluralities of mating teeth provided respectively on relative under portions of the fixed members and on relatively upper portions of the rings for preventing movement of the rings with respect to the fixed members about the axis of the annuli during securement of the releasable members to the fixed members and being disengageable from one another incident to loosening of the releasable members from the fixed members and separation of the relative upper portions of the rings downwardly from the relative under portions of the fixed members to provide for shifting of the rings about the axis of the annuli with resultant corresponding shifting of the arm.

9. The combination with a vehicle frame and a suspension arm; of means connecting the arm to the frame in a joint resiliently resisting torsion of the arm with respect to the frame, said joint comprising a pair of axially aligned elastic annuli spaced from one another and receiving the arm between them, means securing one periphery of each annulus to the arm, rings bonded to the other peripheries of the annuli, fixed members secured to the frame and partially embracing the rings, releasable members detachably secured to the fixed members for partially embracing the rings so as to hold them against the fixed members, and pluralities of mating teeth forming downwardly concave sectors on the fixed members and upwardly convex complementary sectors on the rings for preventing movement of the rings with respect to the fixed members about the axis of the annuli during securement of the releasable members to the fixed members and being disengageable from one another upon substantially vertical separation of said sectors incident to loosening of the releaseable members and rings from the fixed members to provide for shifting of the rings about the axis of the annuli with resultant corresponding shifting of the arm.

10. The combination with a vehicle frame and a suspension arm; of means connecting the arm to the frame in a joint resiliently resisting torsion of the arm with respect to the frame, said joint comprising a pair of axially aligned elastic annuli spaced from one another and receiving the arm between them, means securing the inner peripheries of the annuli to the arm, rings bonded to the outer peripheries of the annuli, fixed members secured to the frame and partially embracing the rings, releasable members detachably secured to the fixed members for partially embracing the rings so as to hold them against the fixed members, and pluralities of mating teeth forming downwardly concave sectors on the fixed members and upwardly convex complementary sectors on the rings for preventing movement of the rings with respect to the fixed members about the axis of the annuli during securement of the releasable members to the fixed members and being disengageable from one another upon substantially vertical separation of said sectors incident to loosening of the releasable members and rings from the fixed members to provide for shifting of the rings about the axis of the annuli with resultant corresponding shifting of the arm.

11. The combination with a vehicle frame and a suspension arm; of means connecting the frame and the arm in a joint resiliently resisting torsion of the arm with respect to the frame, said joint comprising an elastic annulus, means securing the inner periphery of the annulus to the arm, a ring bonded to the outer periphery of the annulus, and means securing the ring to the vehicle frame and comprising a section fixed to the vehicle frame and a depending section releasably secured to the underside of the fixed section for releasably holding the ring in interposition therebetween, said fixed section and ring having upper and lower pluralities of interlocking elements establishing interengaged cooperation between the fixed section and ring when the latter is in the interposed position, said upper plurality of elements being provided on the fixed section and said lower plurality of elements being provided on the ring for normally interlocking the ring and fixed section against relative turning movement but allowing circumferential adjustment upon release downwardly of the releasable section and ring.

12. The combination with a vehicle frame and a suspension arm; of means connecting the frame and arm in a joint resiliently resisting torsion of the arm with respect to the frame, said joint comprising a pair of axially aligned and axially spaced elastic annuli receiving the arm between them, means securing the inner peripheries of the annuli to the arm, rings bonded to the outer peripheries of the annuli, and means securing the rings to the vehicle frame and comprising sections fixed to the vehicle frame and depending sections releasably secured to the underside of the fixed sections for releasably holding the rings in interposition between the fixed sections and releasable sections, said fixed sections and rings having pluralities of upper and lower locking elements establishing interengaged cooperation between the fixed sections and rings when the latter are in the interposed position aforesaid, said pluralities of upper elements being provided on the fixed sections and said pluralities of lower elements being provided on the rings for normally interlocking the rings and fixed sections against relative turning movement but allowing circumferential adjustment upon release downwardly of the releasable sections and rings.

HARRY T. WOOLSON.
GLENN H. PARKER.

REFERENCES CITED

The following references are of record in the file of this patent:

UNITED STATES PATENTS

| Number | Name | Date |
| --- | --- | --- |
| 2,222,377 | Slack | Nov. 19, 1940 |
| 2,246,821 | Utz | June 24, 1941 |
| 2,270,572 | Woolson et al. | Jan. 20, 1942 |